Oct. 11, 1960      W. GLUCK      2,955,555
MANUFACTURE OF VACUUM TUBE SOCKETS Filed June 29, 1956      7 Sheets-Sheet 1

INVENTOR.
WILLIAM GLUCK
BY
James and Franklin
ATTORNEYS.

Oct. 11, 1960 W. GLUCK 2,955,555
MANUFACTURE OF VACUUM TUBE SOCKETS
Filed June 29, 1956 7 Sheets-Sheet 3

INVENTOR.
WILLIAM GLUCK
BY James and Franklin
ATTORNEYS.

Oct. 11, 1960 W. GLUCK 2,955,555
MANUFACTURE OF VACUUM TUBE SOCKETS
Filed June 29, 1956 7 Sheets-Sheet 4

INVENTOR.
WILLIAM GLUCK
BY James and Franklin
ATTORNEYS.

INVENTOR.
WILLIAM GLUCK
BY James and Franklin
ATTORNEYS.

United States Patent Office 2,955,555
Patented Oct. 11, 1960

2,955,555
MANUFACTURE OF VACUUM TUBE SOCKETS

William Gluck, Yonkers, N. Y., assignor to Industrial Electronic Hardware Corp., a corporation of New York Filed June 29, 1956, Ser. No. 595,008

22 Claims. (Cl. 113—1)

This invention relates to the manufacture of connectors, and more particularly to the manufacture of vacuum tube sockets.

The primary object of my invention is to generally improve the manufacture of vacuum tube sockets. Such sockets have a plurality of contacts formed out of sheet metal, and an insulation base holding the contacts. Heretofore the contacts have been made out of a strip of sheet metal fed through a progressive die, with the completed contacts dropped into a drum or barrel. The contacts have been loaded into the insulation base by hand, and also by automatic machinery, but the latter has required hoppering, guiding and handling of the loose contacts. This has been difficult because of the complex shape of the contacts, which usually comprise a pin grip and a terminal connected by a bridge disposed transversely of the pin grip and terminal. The difficulty applies also to the more complex sockets now made for use with printed circuit boards, for example, the socket shown in co-pending application of the present inventor and Seymour Offerman, Serial No. 524,693, filed July 27, 1955, and entitled "Tube Socket for Printed Circuit."

A primary object of the present invention is to overcome the foregoing difficulty, and to provide an improved manufacture of sockets in which a strip of sheet metal is punched and shaped to form a connected series of embryo contacts, which series is fed toward a loading station for insertion in an insulation base. The contacts are not severed until at the loading station, and thus complete control over the contacts is maintained until the time of insertion in the base. No hoppering or guiding of loose contacts is needed.

Formation of the elements takes place in a progressive die. The operating speed when making contacts may differ from the optimum speed for insertion. There may be "down time" because of difficulty with the die, or the need for sharpening the same, but failure or down time of the insertion mechanism may occur at different times. Accordingly a further object of my invention is to separate the main manufacture of the contacts from the insertion, which is done by reeling the strip of embryo contacts, and subsequently unreeling the strip for supply to the assembly mechanism. This has the further advantage of affording an opportunity for thorough cleaning and degreasing of the reels of embryo contacts, for the progressive die is preferably heavily lubricated, whereas the finished socket is preferably free of lubricant. Moreover, with separate presses there is no problem of synchronizing the presses, and each may run at its own optimum speed independently of the other.

As so far described it would be difficult to reel the strip of embryo elements, for the pin grip and terminal post are disposed perpendicular to the bridge. In accordance with a further feature and object of the invention, the rather difficult task of forming the closed pin grip, and the hollow or tubular post, is performed in the progressive die, with the grip and post left end-to-end with the connecting bridge, and with the contacts disposed transversely of the strip. The successive contacts are connected by one or preferably two residual strands of sheet metal, and the resulting substantially flat strip is readily reeled and unreeled. The insertion mechanism itself may be put in a press, and includes appropriate punches for bending the grip and post downward relative to the bridge, and only after completion of the formation of the contact in this fashion is the contact severed from the strip and inserted in the insulation base.

A further object of the invention is to provide mechanism to handle the insulation base and to present it to the contact loading station. An ancillary object is to facilitate loading insulation bases into the mechanism and discharging the filled bases from the mechanism.

The particular mechanism here shown makes a socket for the so-called "miniature" tube, which has seven pins at the spacing of eight, or in some cases eight pins at the spacing of nine. A further object of the present invention is to avoid interruption of the insertion of contacts, and to avoid consequent loss of time and machine output, despite the gap or missing contact in the ring of contacts.

To accomplish the foregoing objects, and other more specific objects which will hereinafter appear, my invention resides in the contact forming and contact assembly elements, and their relation one to another, as are hereinafter more particularly described in the following specification. The specification is accompanied by drawings, in which:

Figures 13, 14:
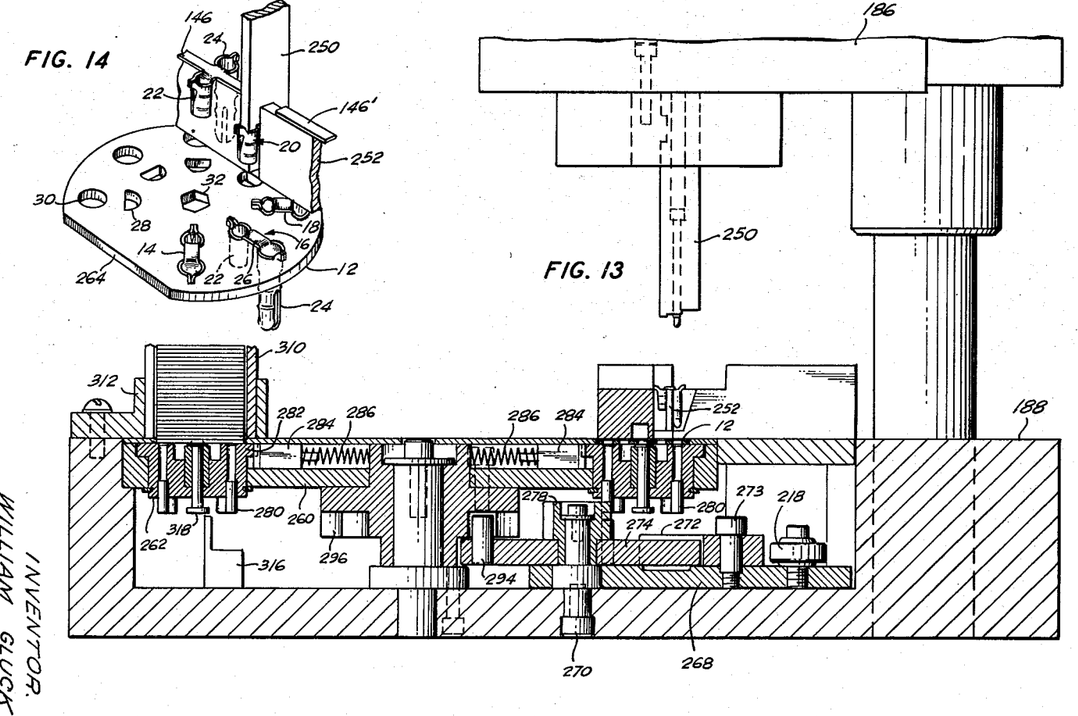
Fig. 13 is a vertical section through the dial mechanism taken in the plane of the line 13—13 of Fig. 10.
Fig. 14 is a perspective view showing the act of insertion of a severed contact from the strip into an insulation base.

Referring first to Fig. 14, the invention is here applied to the manufacture of a laminated socket for miniature tubes. The specific socket being made receives a tube having seven pins on a circle at the spacing of eight, and therefore has seven contacts at the spacing of eight. Also the specific socket being made is intended for use with printed circuit boards subjected later to pot soldering, and the terminals are preferably made in the form of hollow rigid support posts, as is described in detail in the copending application Serial No. 524,693 aforesaid. In Fig. 14 the lower of two wafers of insulation is shown at 12, and it receives metal contacts, three of which have already been loaded into the wafer, as indicated at 14, 16 and 18, while a fourth contact 20 is being loaded into the wafer at a loading station. As is best shown at 16, each of the metal contacts comprises a pin grip 22, and a terminal 24 which in this case is also a support post, connected at their upper ends by a bridge 26. The wafer 12 is provided with two concentric rings of holes 28 and 30, to receive the contacts with the bridge 26 disposed above the wafer. A center hole 32 receives an eyelet (or center ground shield acting as an eyelet) which holds an upper wafer, not shown, assembled with the lower wafer 12, the contacts being anchored therebetween. The apparatus here described makes the contacts out of a strip of sheet metal, and loads the same into the lower wafer 12. The remaining operation of adding the upper wafer is performed separately.

In the particular contact here shown the pin grip 22 is of the split sleeve or barrel type. The terminal post 24 is hollow or tubular in its upper portion, while the lower portion is longitudinally slotted to make the sides resiliently compressible toward one another. The bottom tip is pointed to facilitate insertion of the socket in a ring of mating holes in a printed circuit board, and the said lower or slotted portion has a pair of beads or steps spaced apart an amount corresponding to the thickness of the printed circuit board, so that the latter receives the socket with a snap fit.

Figures 1, 1A:
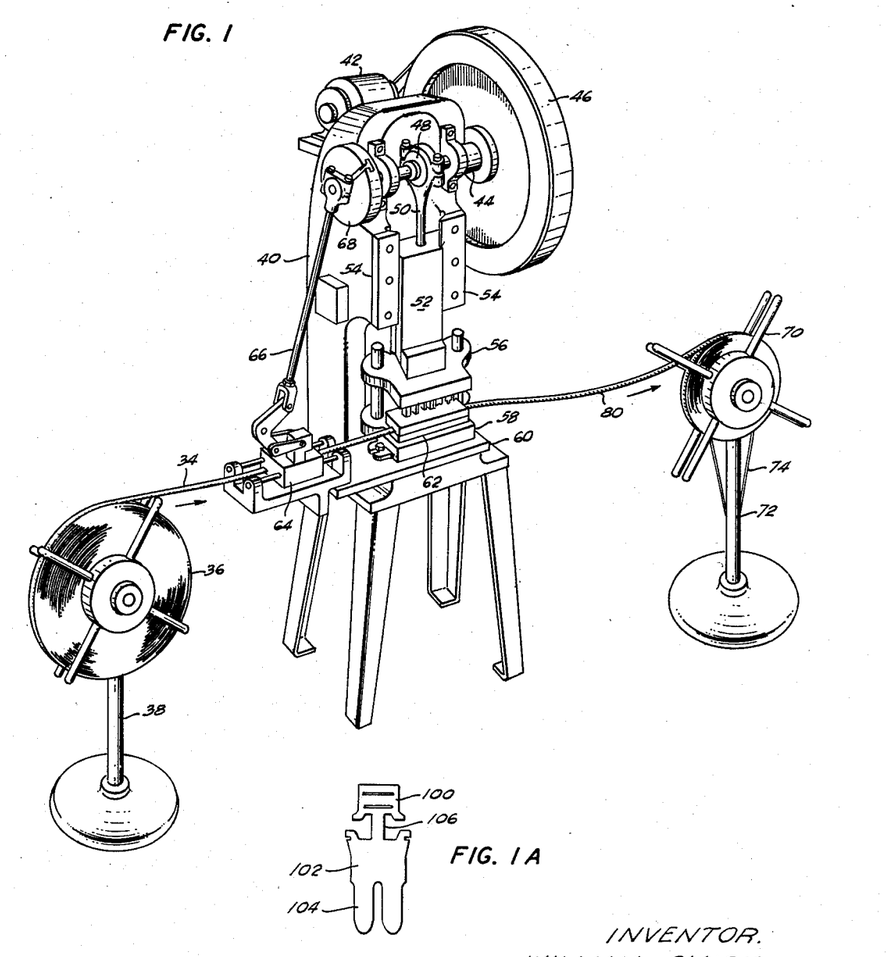
Fig. 1 is a perspective view showing apparatus for forming and reeling a continuous strip of embryo contacts.
Fig. 1A shows the outline of the blank needed to form a single contact.

Referring now to Fig. 1 of the drawing, a strip of sheet metal 34 is fed from a reel 36, rotatable on a conventional reel stand 38. The metal is fed to a punch press 40 which may be conventional, and which in the present case comprises a driving motor 42 turning a main shaft 44 carrying a flywheel 46, and having a crank or eccentric 48 working through a connecting rod 50 to vertically reciprocate a Pitman box 52, slidable in ways 54, and carrying an upper die holder 56, cooperating with a lower die holder 58, mounted on the bed 60 of the press. A suitable progressive die, generally designated 62, is mounted in the die holder to operate on the strip 34, and the latter is fed step by step by a suitable feed means, generally designated 64, and operated by linkage 66 extending upward to a crank wheel 68. The crank 68 may be displaced in phase about 90° from the crank 48, so that the strip 34 is fed between punch operations, and dwells during punch operation.

As will be described in greater detail later, the die 62 serves to progressively punch and shape the strip 34 to form a connected series of embryo contacts, and this connected series is wound up on a reel 70 mounted on a reel stand 72. This may be provided with a conventional take-up motor, hidden behind post 72, which serves to lightly frictionally drive reel 70 through a belt 74. Referring now to Fig. 5, the reel 70 later is mounted on a reel stand 76, and the series of embryo elements 80 is supplied to an assembly machine which has a loading station for inserting contacts into the insulation base. The contacts remain connected and under control in the strip until they reach the loading station, at which point they are severed from the strip and inserted in the base.

Figure 4:
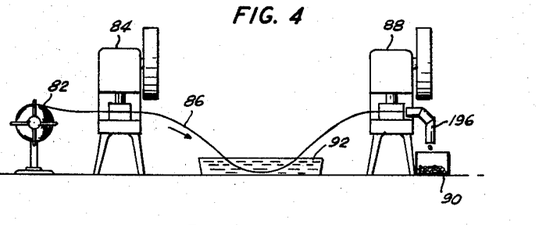
Fig. 4 is a front elevation drawn to reduced scale, showing a modification in which the strip is fed directly from a forming press to an assembly press.
Figures 4A, 5, 6:
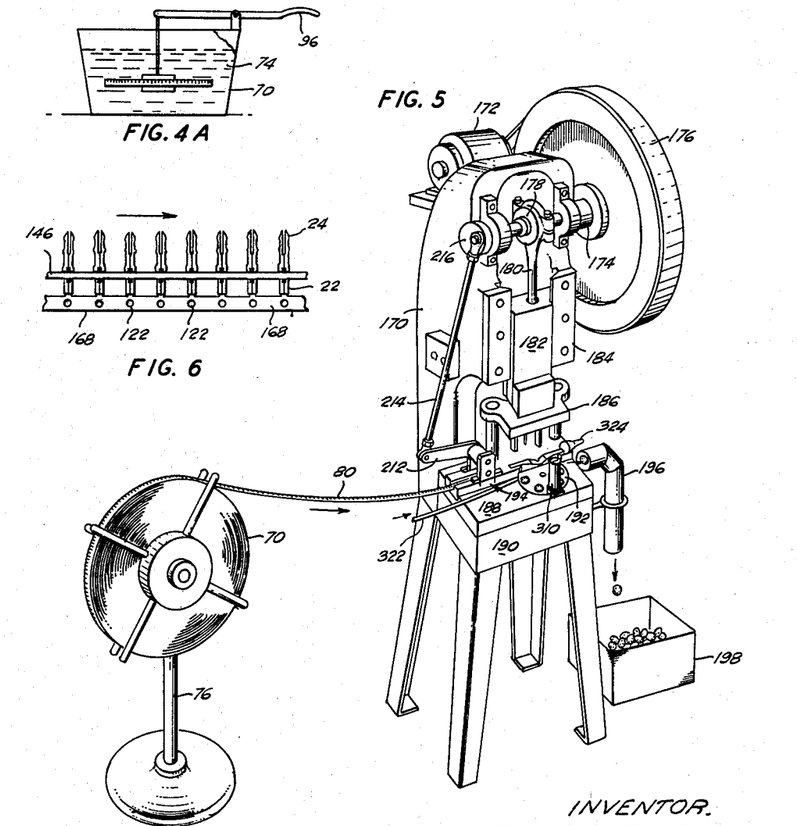
Fig. 4A schematically illustrates the step of cleaning and degreasing a reel of embryo contacts.
Fig. 5 is a perspective view of the assembly mechanism supplied from a reel.
Fig. 6 is a plan view of the strip of embryo contacts as withdrawn from the reel and supplied to the press of Fig. 5.

Of course, it is not essential to reel the strip of embryo contacts between the two operations, and referring to Fig. 4 I show a modified system in which a reel 82 of sheet metal strip is fed through a first press 84 corresponding to that shown in Fig. 1, and serving to produce a series of integrally connected embryo elements 86. This is fed directly to the assembly machine 88, which finishes, severs and loads the contacts into the wafers, and discharges the loaded wafers into a suitable box or drum 90. Inasmuch as the strip is preferably lubricated in press 84, and is preferably free of lubrication in the finished socket, the embryo contact strip 86 may be passed through a cleaning and degreasing bath 92. When using the connected presses 84, 88, as shown, the motors are preferably synchronized so that the presses run in unison.

When the strip is reeled as shown in Figs. 1 and 5, the reel may be subjected to a cleaning and degreasing step, schematically shown in Fig. 4A, in which reel 70 is immersed in a solvent 94, and may be agitated by a lever 96. It will be understood that in the arrangement of Fig. 4 the orientation of the die 62 (Fig. 1) would be reversed, that is, the fabrication in the progressive die would be inverted from top to bottom relative to Fig. 3, so as to present the strip to the press 88 in the desired position, which is shown in Fig. 6.

Although the presses may be connected as shown in Fig. 4, or separated as shown in Figs. 1 and 5, I prefer the latter because of the resulting flexibility in the manufacturing operation. Shutdown of either press does not affect or interrupt the production from the other. The first press may be shut down to sharpen or to service the progressive die 62. The normal operating speed of one press may differ from the other, and thus the plant may be provided with more presses of one type than the other to match their output, or if using an equal number of presses, one may be operated overtime compared to the other for the same purpose.

Figure 2:
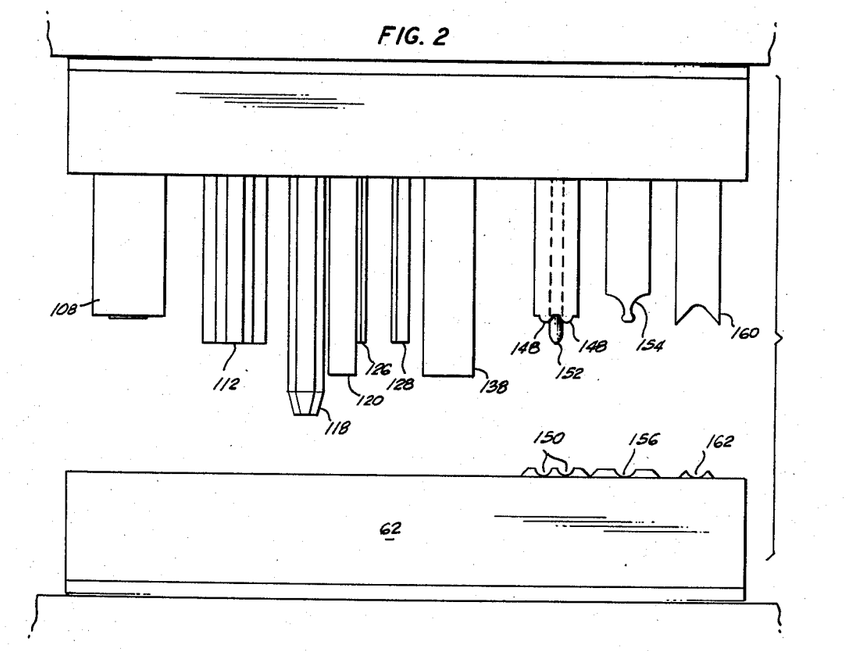
Fig. 2 is a front elevation of the progressive die used in the press of Fig. 1.

Considering the apparatus in greater detail, and referring now to Fig. 2, the die 62 previously referred to comprises a series of cutting and forming punches. The theoretic blank required for the contact is shown in Fig. 1A, and comprises a part 100 which is folded on fold lines extending longitudinally of the blank (vertical in Fig. 1A) to form the pin grip portion of the contact. Another part 102 is rolled to form a hollow or tubular post. The bifurcated portion 104 becomes the slotted lower end of the post. The parts 100 and 102 are connected by a neck 106 which becomes the bridge of the contact.

Figure 3:
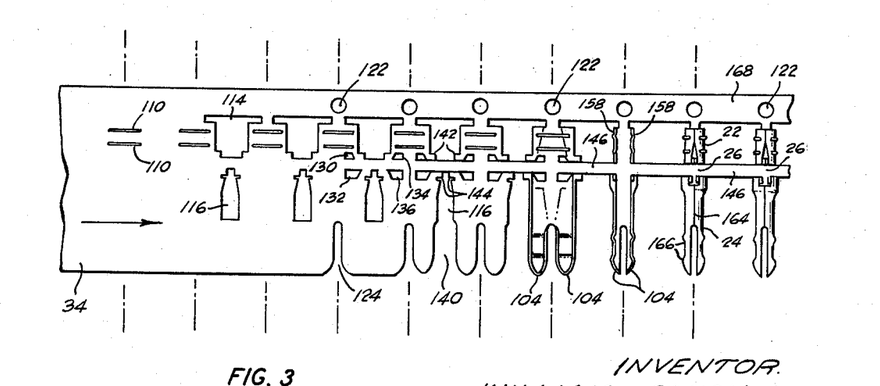
Fig. 3 is a plan view of the strip of sheet metal showing the successive steps in the working of the strip performed by the press of Fig. 1.

Reverting now to Figs. 2 and 3 of the drawing, the strip 34 (Fig. 3) is first operated on by a punch 108 (Fig. 2) which indents the material to form two channels or downwardly projecting beads 110. The next operation is a piercing operation performed by a punch 112 which cuts away material to form two apertures 114 and 116. The next element 118 of the die is used as a pilot cooperating with one of the apertures. The next punch 120 forms a pilot hole 122 near one edge of the strip 34 and a slot 124 through the opposite edge. The next punches 126, 128 form four small apertures 130, 132, 134, 136. The next punch 138 cuts away metal at 140 communicating with the aperture 116 previously made. Also the four tabs 142 and 144 are incised or slit to free the same from the connecting strand 146, which strand extends longitudinally of the strip.

The remaining punches perform a shaping or forming rather than cutting operation. The first such punch has parts 148 which cooperate with bottom die parts 150 to give legs 104 a concave or trough shape. The part 152 on the upper die is a pilot which enters the hole 122. The next punch 154 cooperates with bottom die 156 to bend upward the side edges 158 of the pin grip, and also to bend upward the legs 104. The next punch 160 cooperates with bottom die at 162 to fold together the sides of the pin grip and thus close the same, as shown at 22, and also to close together the sides of the post until the abutting edges meet, as indicated at 164, thus completing the formation of a generally tubular post 24 with a slotted lower portion, and with beads or steps 166 spaced apart an amount corresponding to the thickness of the printed circuit board in which the posts are to be received with a snap fit.

The piece of flat sheet metal between the grip 22 and post 24 later becomes the bridge 26, and at the right-hand end of Fig. 3 it will be seen that there is a series of embryo contacts disposed transversely across the strip, and connected to one another by a strand of sheet metal 146 extending longitudinally of the strip and connecting together the bridge portions 26 of the successive contacts. Moreover, in the particular strip here shown the successive parts are additionally connected together by another strand 168 running along one edge of the strip, and connecting the ends of the contacts, or, in the case here shown, connecting the ends of the pin grips. This strand 168 also provides the series of pilot holes 122 which are additionally used later in the assembly machine.

The strip in the form shown at the right end of Fig. 3 is the strip 80 in Fig. 1 which is wound on reel 70, and which then may be stored if desired, or immediately cleaned and degreased, as shown schematically in Fig. 4A, preparatory to unreeling the same, as shown at 70, 80 in Fig. 5. The orientation of the strip when unreeled is shown in Fig. 6, and it will be noted that there is a reversal of disposition of the strip, the terminal posts 24 now being on the further edge, and the pin grips 22 with their connecting strand 168 now being at the nearer edge of the strip. This is the disposition wanted in the assembly press 170, and indeed the die 62 (Fig. 1) is so designed as to form the strip of contacts in reverse position, so that when the strip is unreeled as shown in Fig. 5, the posts and grips will be in the position desired in the assembly machine.

In Fig. 5 it will be seen that the assembly mechanism is itself mounted in a press 170, which may be a standard press, and may be but need not be similar to that shown in Fig. 1. It comprises a motor 172 turning a shaft 174 carrying a flywheel 176 and turning a crank or eccentric 178 having a connecting rod 180 leading to a Pitman box 182 vertically slidable in ways 184. It carries an upper die holder 186 with a series of punches. The lower die holder is replaced by special mechanism housed at 188, and mounted on the bed 190 of the press. Briefly, there is a dial 192 which facilitates feeding insulation wafers to a loading station, and the strip of embryo contacts 80 is fed to the loading station by feed means, generally designated 194. The loaded wafers are removed from the loading station by the same dial 192, and are then discharged through a suitable chute 196 to a box or bin 198.

Figure 7:
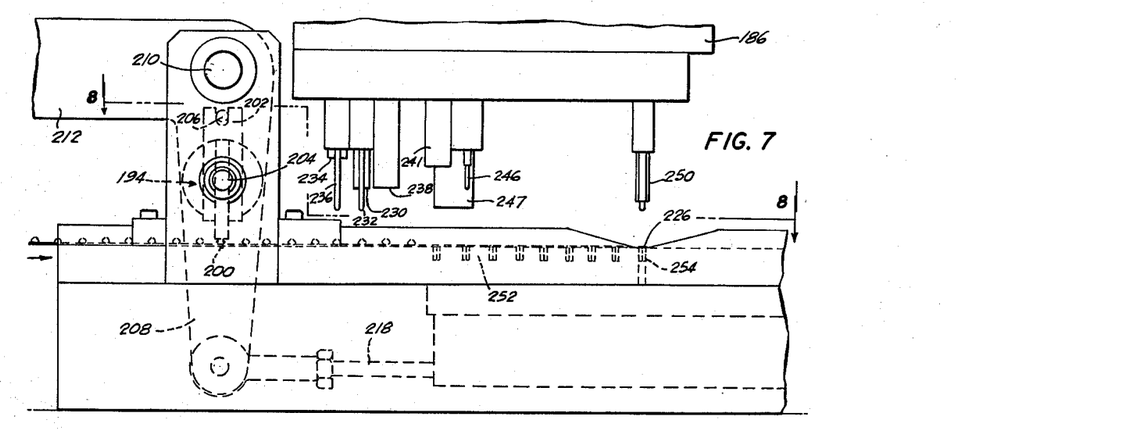
Fig. 7 is a front elevation of the strip feed mechanism and the die portion or forming mechanism of the machine.
Figure 8:
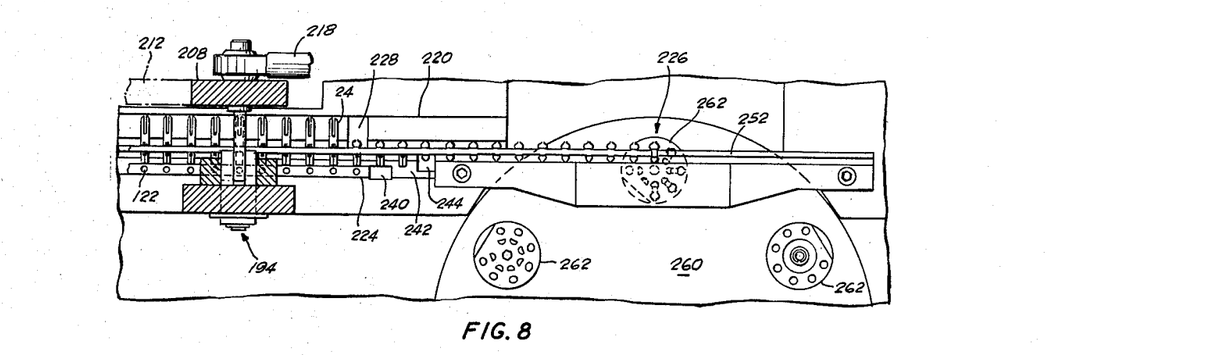
Fig. 8 is a plan view of the same.
Figure 9:
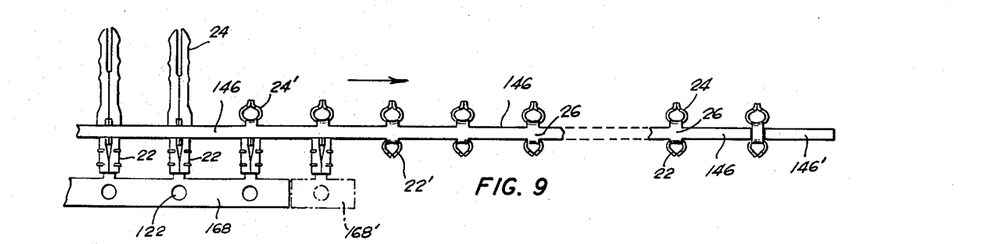
Fig. 9 is a plan view of the strip showing the completion and final severance of the completed contact from the strip in the assembly machine.

Referring now to Figs. 7, 8 and 9, the feed mechanism comprises a feed tooth 200 which enters one of the pilot holes 122 (Fig. 9) in strand 168. The tooth 200 is oscillated by an arm or feed dog 202 pivoted at 204 and operated by a pin 206. The latter is carried by one arm 208 of an angle lever which is pivoted at 210, and the other arm 212 of which is shown in Fig. 5 as connected to a link 214 extending upward to a crank 216 on shaft 174. Reverting to Fig. 7, the lower end of arm 208 is connected to a link 218 which extends to mechanism for operating the dial, to be described later.

Referring now to Fig. 8, the feed means, generally designated 194, feeds the strip over a bottom die where it is accurately guided between vertical guide walls at 220 and 224. The connecting strand 146 rests on a narrow support rail 252 which extends all the way to the loading station 226. The post 24 rests on a support track which is cut away at 228. At this point a punch on the upper die bends the post down from horizontal to vertical position, as is most clearly shown by the change from 24 to 24' in Fig. 9. In Fig. 7 the punch for this purpose is shown at 230, and is associated with a pilot 232. Fig. 8 is displaced slightly to the left, compared to Fig. 7, that is, the punch positions are not directly superposed (as they are in Figs. 2 and 3). A previous punch 234 and associated pilot 236 may be used to slightly bump or flatten the pin grip 22, preparatory to a later sizing operation which opens the pin grip to exactly desired size. This bumping step could be performed in the first machine.

Reverting to Fig. 9, the next step is to cut away one unit length 168' of the connecting strand 168. This is done by a punch 238 shown in Fig. 7, and cooperating with a mating hole in the bottom die shown at 240 in Fig. 8.

A next step, best shown in Fig. 9, is to bend the pin grip 22 from horizontal position to the vertical position shown at 22'. This is done by a punch 241 shown in Fig. 7, and referring to Fig. 8, a bottom support surface 242 is cut away at 244 to cooperate with the punch 241 during this bending operation. The contact strip now takes the form shown in the righthand portion of Fig. 9, there being substantially completed contacts each having a vertical grip 22 and a post 24 connected by a horizontal bridge 26, and the said horizontal bridges being connected to one another by the remaining strand 146. The latter rests on top of the upright or edgewise support rail 252 (Fig. 8), and the strip is guided by reason of the series of grips 22 on one side of the rail, and the series of posts 24 on the other side of the rail. Reverting to Fig. 7, an additional punch 246 may be provided to size the grip 22. The punch 246 is essentially a pin having a diameter so related to the diameter of the tube pins that entry of punch 246 into the split sleeve pin grip 22 serves to size it to desired dimension. The part 247 is a spring yieldable pad which engages the connecting strip 146 (Fig. 9) including the bridge 26, and holds the strip down during the punch operation, and particularly during the rise of the sizing pin 246. Thus the part 247 acts as a stripper.

It will be understood that in Fig. 9 the operations have been shown close to one another to save space, but in practice idle poistions may exist between operating stations, and Figs. 7 and 8 are better showings of the apparatus in this respect. A first station 234, 236 pilots the strip and bumps the pin grip to flatten it slightly. A second station 230, 232 pilots the strip and bends the post from horizontal to vertical position. A third station 238 cuts away a unit length of the connecting strand 168, the scrap dropping through the bed of the die. A fourth station is idle. A fifth station 241 bends the pin grip from horizontal to vertical position, and a sixth station 246 inserts the sizing pin in the grip. Then there are a number of stations, in this case nine stations from six to fifteen, which are idle until the loading station is reached.

Referring now to Fig. 7, the loading station has a combined punch and inserting tool 250. The edgewise guide rail, indicated at 252, is cut away at 254 and acts as a bottom die. Referring to Fig. 9, the bridge portion of the contact is punched downward, away from the connecting strand 146, leaving free a leading end or unit 146' of connecting strand. This is blown away by compressed air, and is received in a scrap collector. The punch 250 (Fig. 7) has a pin portion which meanwhile frictionally enters the post, and carries the contact downward for insertion into the insulation wafer, which is waiting therebeneath at the loading station, as shown at station 226 in Fig. 8.

Figures 10, 10A:
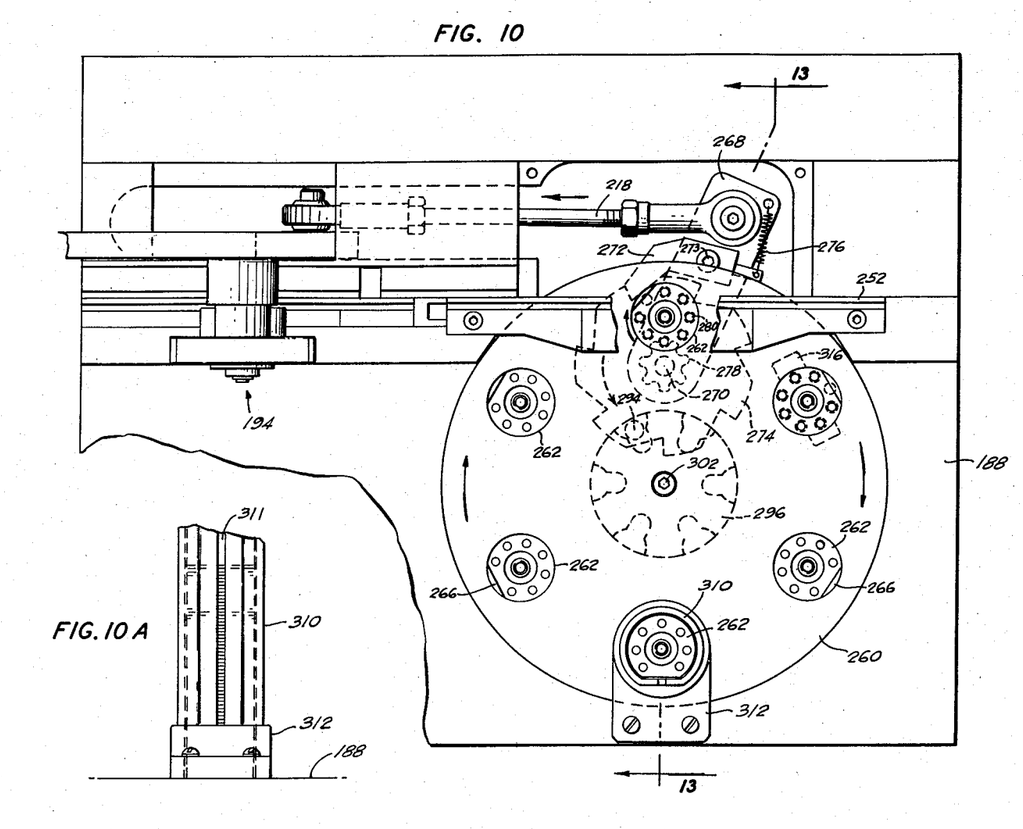
Fig. 10 is a plan view of the dial mechanism of the assembly machine at the beginning of movement of the dial to carry a loaded insulation base away from the loading station and a new or empty base into the loading station.
Fig. 10A is a front elevation of the lower end of the magazine wafer.

The dial mechanism which handles the wafers may be described with reference to Figs. 10 through 13 of the drawing. In Fig. 10 there is an intermittently rotatable dial 260, having a plurality of recessed nests 262. Each nest is rotatable on the dial, and is adapted to receive and rotate an insulation wafer. Fig. 14 shows that the particular wafer here used has a flat 264, opposite the gap or missing contact, and accordingly the nests 262 (Fig. 10) in the present case have a corresponding flat which assures proper orientation and turning of the wafer with the nest. In other words, the circular nest 262 is built up at 266 to bear against the flat of the wafer, thus acting as a key which insures rotation of the wafer, it being understood that the horizontal surface of the nest is lower than the top surface of the main dial 260, thereby forming pockets to receive the wafers.

Wafers may be loaded mechanically or manually onto the dial. There is ample time for manual loading because the dial remains in one position until a wafer at the loading station is completely filled with contacts. Moreover, a wafer may be loaded into any of the series of exposed nests, or a number of wafers may be loaded at once to fill all of the exposed nests. For mechanical loading of wafers described later, the nest is recessed by only the thickness of one wafer.

When a nest is at the loading station it is intermittently rotated to bring the successive holes of the wafer beneath the loading punch. For this purpose the particular mechanism here shown comprises the horizontally reciprocable link 218 previously referred to. This is connected to an arm 268, pivoted at 270, and carrying a pawl 272 pivoted at 273. The latter is urged toward a ratchet wheel 274, by a pull spring 276. Ratchet wheel 274 has seven notches or teeth in the present case, where there are seven contacts, and the pawl travel is suitably adjusted to move the ratchet wheel from one tooth to the next, or one-seventh of a turn. The ratchet wheel 274 carries a gear 278 which has seven teeth, and these mesh with gear teeth on the nest 262.

In the present case instead of using an ordinary spur gear beneath nest 262, which could be done, I employ vertical pins, best shown at 280 in Fig. 13. There are eight such pins, corresponding to the eight positions of the wafer, and it will be evident that each operation of the press advances the wafer one position to receive another contact. Of course, the wafer should dwell during the insertion, and should move between insertions, and for this purpose the crank 216 (Fig. 5) is displaced about 90° from the crank 178. Thus the contact strip 80 is fed, and the wafer is turned, between punch operations, and during the punch operation the strip and wafer are stationary, as they should be. It will also be understood from Figs. 10 and 13 that the pins 280 of the nest 262, which may be collectively referred to as a gear beneath the nest, come into mesh with the ratchet gear or drive gear 278 automatically when the dial 260 is turned to bring a new wafer into position at the loading station.

Figure 11:
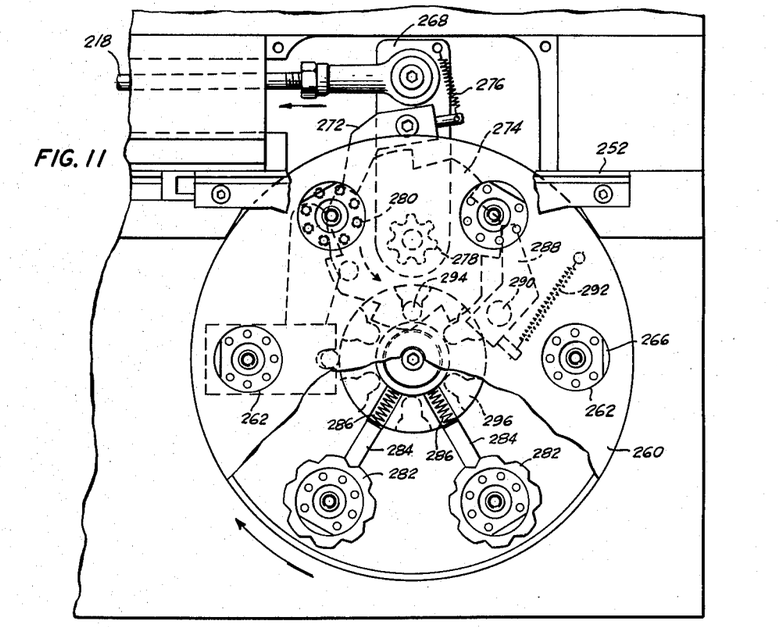
Fig. 11 is a view similar to Fig. 10, but showing the relation of the parts at the middle of the dial movement.

To more accurately fix the wafer positions, suitable spring detent means may be employed for each of the nests, and this is illustrated in Fig. 11, in which each nest has a notched wheel 282 cooperating with a detent 284 pressed against the wheel by a compression spring 286. The notches are so blunt as not to interfere with turning of the nest by the drive gear 278, but after each ratchet movement the nest is accurately centered or piloted by the detent 284. Fig. 11 also shows a check pawl 288 pivoted at 290 and urged against the ratchet wheel 274 by a pull spring 292. This guards against possible return movement of the ratchet wheel during return movement of the operating pawl 272.

Figure 12:
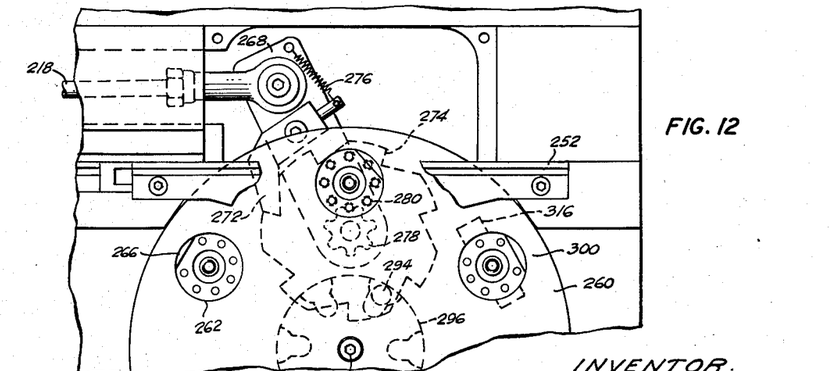
Fig. 12 is a fragmentary view similar to Fig. 11, but showing the relation of the parts at the completion of the dial movement.

To intermittently turn the dial 260 I employ a Geneva gear type of mechanism. Specifically the ratchet wheel 274 (Figs. 10 and 13) carries a single Geneva tooth or pin 294. The dial has a Geneva gear 296, with as many slots or teeth as there are nests in the dial. In the present case there are six, but the dial could have a greater or lesser number of nests. During most of the rotation of the ratchet wheel 274 the pin 294 is remote from Geneva gear 296, and the dial remains stationary. Only the nest turns, until it is loaded with contacts. At that time the tooth or pin 294 reaches the Geneva gear 296, as shown in Fig. 10, and the next movement of the ratchet wheel 274 causes rotation of the dial. In Fig. 10 a wafer has just been loaded, and movement of the dial is about to begin. In Fig. 11 the dial has moved about half its distance, and the nest carrying the loaded wafer has moved away from the loading station, while the next nest with its empty wafer has moved toward the loading station. In Fig. 12 the motion of the dial has been completed, and pin 294 is leaving the Geneva gear 296. The new or empty wafer is at the loading station, and the filled wafer is at the next station, which may be a discharge station, located at 300.

At this station the filled wafer is blown from the nest into the chute 196 and thence to box 198, as shown in Fig. 5. If desired a mechanical means may be provided to eject the loaded wafer upward. In the present case the loaded wafer is ejected with the aid of an ejector or lift pin at the center of each nest, this being best shown at 318 in Fig. 13. The lift pin is raised by a stationary cam disposed beneath the lift pin immediately preceding and at the discharge station, this cam being marked 316 in Figs. 10 and 12. Its nature is suggested at 316 in Fig. 13, but not in proper location. An air tube is disposed at the discharge station, and when the wafer is lifted by the lift pin it is blown outward by a puff of air. The air is supplied through an air tube shown at 322 in Fig. 5 and may be controlled by a valve operated in synchronism with the press.

The scrap 146' (Fig. 9) is blown away by an air jet into a receptive funnel the mouth of which is disposed in suitable position to receive the scrap. This funnel is schematically indicated at 324 in Fig. 5, and it will be understood that air for both the funnel 324, and for the socket at chute 196, both may be supplied through pipe 322, and may be controlled by the same valve, or separate pipes may be used with separate valves.

In Figs. 10, 11 and 12 the nests on the dial all have a similar orientation when not at the loading station. Specifically, I locate the flat, which may be called "position eight," radially outward relative to the dial. Position eight requires no contact. In Fig. 10 it will be seen that the wafer at the loading station has its flat displaced, and what is there beneath the punch at the loading station is "position seven," corresponding to the loading of the seventh or last contact. From study of Fig. 10 it will be seen that the ensuing rotation of the dial causes the nest to turn, there being a relative rotation of gears 278 and 280, partly because gear 278 turns, and partly because gear 280 swings about the center 302 of the dial.

The nest is moved from position seven to position eight as it moves out of the loading station, and this is shown by the change from Fig. 10 to Fig. 11. Similarly by comparison of Figs. 11 and 12 it will be seen that the nest bringing the new wafer to the loading station is moved from position eight to position one, that is, in Fig. 12, position one of the wafer is beneath the contact inserting punch. This motion is again caused partly by rotation of gear 278, and partly by the transfer of the nest about the center of the dial as the pin or tooth of the next gear comes into mesh with the drive gear 278.

Miniature tubes also are made with eight pins at a spacing for nine, and more generally it may be said that the socket is of the type having "n−1" contacts at the spacing of "n," and that the dial carries the wafer in position "n," and that the nest is moved from position "n" to position "one" by the relative motion of the nest and ratchet gear as the nest moves into the loading station, and later on is moved from position "n−1" to position "n" by the relative movement of the nest and ratchet gear as the nest moves away from the loading station.

This is an important feature of the present invention, because one consequence of this arrangement is that the press and insertion punch may operate continuously without any interruption to take care of the position "n" on each socket where there is no contact. With some other arrangement it would be necessary to interrupt the feed of the contact strip at intervals to compensate for the blank position "$n$," and that would not only complicate the apparatus, but would reduce its output by one-seventh in the present case, even assuming that the press speed (r.p.m.) could be maintained.

Viewed in somewhat different aspect, it may be stated that the nest is moved one-eighth of a turn for each stroke of the ratchet pawl from positions one through seven, and that thereupon in an equally short space of time the nest is moved two positions all the way from position seven through position eight to position one. This is done without in any way changing the stroke of the pawl, and solely because the revolution of the nest about the center of the dial, is added to the normal drive movement of the ratchet gear 278. This change is coincident with the movement of the dial, and accordingly there is no delay or dwell in the loading operation required to accommodate the dial movement. Viewed in still another way, position eight is not a loading position and never exists at the loading station. The nest is moved from position eight to position one as it comes into loading position, and it is moved from position seven to position eght as it is moved out of the loading station, and thus no dwell or delay at the loading station is needed to take care of position eight.

To feed the wafers automatically to the dial it is merely necessary to dispose an upright tubular magazine over the path of the nests in the dial. The lower end of such a magazine is shown at 310 in Fig. 5, and again in Figs. 10 and 10A. The magazine preferably has a flat to conform to the shape of the wafer, and the magazine is preferably vertically slotted either intermittently or continuously, as shown at 311 in Fig. 10A, so that an operator may see at a glance the height of the stack of wafers remaining in the magazine. The lower end of the magazine is received in a supporting bracket 312 secured to the bottom die or dial holder 188. It will be understood that by recessing the nests an amount no greater than the thickness of a wafer, the lowermost wafer in the magazine will be received in the nest and slid away from beneath the magazine until the next nest comes beneath the magazine, where it in turn picks up the next wafer, and so on.

The recessing of the nest may be made slightly greater than the thickness of a wafer by beveling the edge of the nest so that only one wafer is carried along. By making the magazine tube 310 readily detachable from the holder 312, one or more magazine tubes may be loaded with wafers away from the machine, and then inserted in the machine. Other loading arrangements may be employed, such as holding a tube filled with wafers over the top end of the magazine tube, and letting the stack slide from the upper tube into the lower tube.

The complete operation of substantially completely forming the metal contacts before severing the same for insertion in the wafer, is illustrated by combining Figs. 3 and 9 of the drawing end to end, disregarding for the moment the reversal in the position of the strip. This reversal has been introduced only because of the reeling and unreeling of the strip, and it will be understood that in the arrangement of Fig. 4 there would be no such reversal.

From this viewpoint an important feature of the present invention is the apportionment of the fabricating steps as between the first press and the second press. The connected series of embryo elements shown in the right-hand part of Fig. 9 would be ill-adapted for reeling and unreeling. The reel would be extremely bulky for a given length of strip, and the contacts would undoubtedly be deformed and injured by reeling and unreeling. However, the strip in the form shown at the right of Fig. 3 and in Fig. 6 is essentially a flat strip which is readily and compactly reeled, and as readily unreeled. Thus the apportionment of the fabricating steps in the progressive die operations is so selected that in the first press the steps are carried to the optimum point where maximum work has been completed, while still retaining a strip which is flat and strong (preferably with multiple connecting strands) and in optimum condition for reeling and unreeling. In the second press a minimum number of additional steps is performed, which, if performed earlier, would spoil the strip for reeling and unreeling. (A possible exception is the initial grip bumping action in the second press, but this is minor, not essential, and equally well could be performed in the first press.)

It is believed that the construction and operation, as well as the advanatges of my improved apparatus, will be apparent from the foregoing detailed description. There is no problem of tangling of loose contacts, and no need to handle, hopper or guide loose contacts. The individual contacts are maintained under positive control until the very moment of insertion into the insulation wafer. The complete operation may be performed in a single apparatus, but there are advantages in using separate machines for making the embryo contact strip, and for severing and inserting the finished contacts in the wafer. The speeds of operation are independent; the numbers of machines may differ, down time may differ, for servicing of one does not affect the production of the other; and one may be thoroughly lubricated, while the contacts are kept free of lubrication when being inserted in the wafer. The apportionment of the progressive die operations is such that the embryo contact strip is readily and safely reeled and unreeled. The dial arrangement facilitates loading empty wafers and discharging filled wafers. The particular dial arrangement here disclosed takes care of sockets of the type having "$n-1$" contacts at the spacing of "$n$," and it does so without requiring any interruption in the strip feed and contact insertion. The entire movement of one wafer out of the loading station and another into the loading station takes place between two normal contact insertion strokes, and the extra movement of the wafer is obtained without non-uniformity in the mechanism which turns the wafer step-by-step for successive contact insertions.

It will be understood that while I have shown and described my apparatus in a preferred form, changes may be made in the apparatus shown, without departing from the scope of the invention, as sought to be defined in the following claims.

I claim:

1. Apparatus for making a vacuum tube socket having an insulation base and a ring of contacts, said apparatus comprising an intermittently rotatable dial having a plurality of nests which revolve with the dial on the axis of the dial, each nest being rotatable on the axis of the nest relative to said dial and being adapted to receive and rotate an insulation base having a ring of holes for said contacts, a loading station including means to insert a contact into an insulation base, means to intermittently rotate the nest on its axis at said loading station until it is loaded with contacts, means to intermittently rotate said dial at longer intervals such as to move a loaded base away from the loading station and a new base into the loading station, means to drive the aforesaid means in properly timed relation, and means to support the aforesaid means.

2. Apparatus for making a vacuum tube socket having an insulation base and a ring of contacts, said apparatus comprising an intermittently rotatable dial having a plurality of nests which revolve with the dial on the axis of the dial, each nest being rotatable on the axis of the nest relative to said dial and being adapted to receive and rotate an insulation base having a ring of holes for said contacts, a loading station including means to insert a contact into an insulation base, means to intermittently rotate the nest on its axis at said loading station until it is loaded with contacts, means to intermittently rotate said dial at longer intervals such as to move a loaded base away from the loading station and a new base into the loading station, the first intermittent means comprising a ratchet wheel beneath said dial centered between the loading station and the center of the dial, a pawl to turn said ratchet wheel, a gear turned by said ratchet wheel, a gear adapted to mesh with said ratchet gear secured beneath each of said nests, said nest gear coming into mesh with said ratchet gear as said nest moves into the loading station, means to drive the aforesaid means in properly timed relation, and means to support the aforesaid means.

3. Apparatus for making a vacuum tube socket having an insulation base and a ring of contacts, said apparatus comprising an intermittently rotatable dial having a plurality of nests which revolve with the dial on the axis of the dial, each nest being rotatable on the axis of the nest relative to said dial and being adapted to receive and rotate an insulation base having a ring of holes for said contacts, a loading station including means to insert a contact into an insulation base, means to intermittently rotate the nest on its axis at said loading station until it is loaded with contacts, means to intermittently rotate said dial at longer intervals such as to move a loaded base away from the loading station and a new base into the loading station, the first intermittent means comprising a ratchet wheel beneath said dial centered between the loading station and the center of the dial, a pawl to turn said ratchet wheel, a gear turned by said ratchet wheel, a gear adapted to mesh with said ratchet gear secured beneath each of said nests, said nest gear coming into mesh with said ratchet gear as said nest moves into the loading station, and said dial rotating means comprising a Geneva tooth on said ratchet wheel and a Geneva gear on said dial, said tooth coming into mesh with said gear in proper timed relation to change the nest at the loading station when the base at the loading station has been filled with contacts, means to drive the aforesaid means in properly timed relation, and means to support the aforesaid means.

4. Apparatus for making a vacuum tube socket having an insulation base and a ring of contacts, said apparatus comprising an intermittently rotatable dial having a plurality of nests which revolve with the dial on the axis of the dial, each nest being rotatable on the axis of the nest relative to said dial and being adapted to receive and rotate an insulation base having a ring of holes for said contacts, a loading station including means to insert a contact into an insulation base, means to intermittently rotate the nest on its axis at said loading station until it is loaded with contacts, means to intermittently rotate said dial at longer intervals such as to move a loaded base away from the loading station and a new base into the loading station, the first intermittent means comprising a drive gear beneath said dial and centered between the loading station and the center of the dial, a gear adapted to mesh with said drive gear secured beneath each of said nests, said nest gear coming into mesh with said drive gear as said nest moves into the loading station, said socket being of the type having $n-1$ contacts at the spacing of $n$, and said nest being moved from position $n$ to position one by the relative motion of the nest and drive gear as the nest moves into the loading station, and being moved from position $n-1$ to position $n$ by the relative movement of the nest and ratchet gear as the nest moves away from the loading station, whereby the insertion of contacts may proceed continuously without interruption despite the blank position $n$ on each socket, means to drive the aforesaid means in properly timed relation, and means to support the aforesaid means.

5. Apparatus for making a vacuum tube socket having an insulation base and a ring of contacts said apparatus comprising an intermittently rotatable dial having a plurality of nests which revolve with the dial on the axis of the dial, each nest being rotatable on the axis of the nest relative to said dial and being adapted to receive and rotate an insulation base having a ring of holes for said contacts, a loading station including means to insert a contact into an insulation base, means to intermittently rotate the nest on its axis at said loading station until it is loaded with contacts, means to intermittently rotate said dial at longer intervals such as to move a loaded base away from the loading station and a new base into the loading station, the first intermittent means comprising a ratchet wheel beneath said dial centered between the loading station and the center of the dial, a pawl to turn said ratchet wheel, a gear turned by said ratchet wheel, a gear adapted to mesh with said ratchet gear secured beneath each of said nests, said nest gear coming into mesh with said ratchet gear as said nest moves into the loading station, and said dial rotating means comprising a Geneva tooth on said ratchet wheel and a Geneva gear on said dial, said tooth coming into mesh with said gear in proper timed relation to change the nest at the loading station when the base at the loading station has been filled with contacts, said socket being of the type having $n-1$ contacts at the spacing of $n$, and said nest being moved from position $n$ to position one by the relative motion of the nest and ratchet gear as the nest moves into the loading station, and being moved from position $n-1$ to position $n$ by the relative movement of the nest and ratchet gear as the nest moves away from the loading station, whereby the insertion of contacts may proceed continuously without interruption despite the blank position $n$ on each socket, means to drive the aforesaid means in properly timed relation, and means to support the aforesaid means.

6. Apparatus for making a vacuum tube socket having an insulation base and a ring of contacts each formed out of a single piece of sheet metal and each having a pin grip and a terminal, said apparatus receiving an integrally connected series of embryo contacts, said apparatus comprising a reciproctaing press having means at a loading station to sever the endmost contact from the series to insert it downward into an insulation base, an intermittently rotatable dial having a plurality of nests, each nest being rotatable on said dial and adapted to receive and rotate an insulation base having a ring of holes for said contacts, means to intermittently rotate the nest at said loading station until it is loaded with contacts, means to intermittently rotate said dial at longer intervals such as to move a loaded base away from the loading station and a new base into the loading station, means to drive the aforesaid means in properly timed relation, and means to support the aforesaid means.

7. Apparatus for making a vacuum tube socket having an insulation base and a ring of contacts each formed out of a single piece of sheet metal and each having a pin grip and a terminal, said apparatus receiving an integrally connected series of embryo contacts, said apparatus comprising a reciprocating press having means at a loading station to sever the endmost contact from the series and to insert it downward into an insulation base, an intermittently rotatable dial having a plurality of nests, each nest being rotatable on said dial and adapted to receive and rotate an insulation base having a ring of holes for said contacts, means to intermittently rotate the nest at said loading station until it is loaded with contacts, means to intermittently rotate said dial at longer intervals such as to move a loaded base away from the loading station and a new base into the loading station, the first intermittent means comprising a ratchet wheel beneath said dial and centered between the loading station and the center of the dial, a pawl operated by said press to turn said ratchet wheel, a gear turned by said ratchet wheel, a gear adapted to mesh with said ratchet gear secured beneath each of said nests, said nest gear coming into mesh with said ratchet gear as said nest moves into the loading station, means to drive the aforesaid means in properly timed relation, and means to support the aforesaid means.

8. Apparatus for making a vacuum tube socket having an insulation base and a ring of contacts each formed out of a single piece of sheet metal and each having a pin grip and a terminal, said apparatus receiving an integrally connected series of embryo contacts, said apparatus comprising a reciprocating press having means at a loading station to sever the endmost contact from the series and to insert it downward into an insulation base, an intermittently rotatable dial having a plurality of nests, each nest being rotatable on said dial and adapted to receive and rotate an insulation base having a ring of holes for said contacts, means to intermittently rotate the nest at said loading station until it is loaded with contacts, means to intermittently rotate said dial at longer intervals such as to move a loaded base away from the loading station and a new base into the loading station, the first intermittent means comprising a ratchet wheel beneath said dial and centered between the loading station and the center of the dial, a pawl operated by said press to turn said ratchet wheel, a gear turned by said ratchet wheel, a gear adapted to mesh with said ratchet gear secured beneath each of said nests, said nest gear coming into mesh with said ratchet gear as said nest moves into the loading station, and said dial rotating means comprising a Geneva tooth on said ratchet wheel and a Geneva gear on said dial, said tooth coming into mesh with said gear in proper timed relation to change the nest at the loading station when the base at the loading station has been filled with contacts, means to drive the aforesaid means in properly timed relation, and means to support the aforesaid means.

9. Apparatus for making a vacuum tube socket having an insulation base and a ring of contacts each formed out of a single piece of sheet metal and each having a pin grip and a terminal, said apparatus receiving an integrally connected series of embryo contacts, said apparatus comprising a reciprocating press having means at a loading station to sever the endmost contact from the series and to insert it downward into an insulation base, an intermittently rotatable dial having a plurality of nests, each nest being rotatable on said dial and adapted to receive and rotate an insulation base having a ring of holes for said contacts, means to intermittently rotate the nest at said loading station until it is loaded with contacts, means to intermittently rotate said dial at longer intervals such as to move a loaded base away from the loading station and a new base into the loading station, the first intermittent means comprising a drive gear beneath said dial and centered between the loading station and the center of the dial, a gear adapted to mesh with said drive gear secured beneath each of said nests, said nest gear coming into mesh with said drive gear as said nest moves into the loading station, said socket being of the type having $n-1$ contacts at the spacing of $n$, and said nest being moved from position $n$ to position one by the relative motion of the nest and ratchet gear as the nest moves into the loading station, and being moved from position $n-1$ to position $n$ by the relative movement of the nest and ratchet gear as the nest moves away from the loading station, whereby the insertion of contacts may proceed continuously without interruption despite the blank position $n$ on each socket, means to drive the aforesaid means in properly timed relation, and means to support the aforesaid means.

10. Apparatus for making a vacuum tube socket having an insulation base and a ring of contacts each formed out of a single piece of sheet metal and each having a pin grip and a terminal, said apparatus receiving an integrally connected series of embryo contacts, said apparatus comprising a reciprocating press having means at a loading station to sever the endmost contact from the series and to insert it downward into an insulation base, an intermittently rotatable dial having a plurality of nests, each nest being rotatable on said dial and adapted to receive and rotate an insulation base having a ring of holes for said contacts, means to intermittently rotate the nest at said loading station until it is loaded with contacts, means to intermittently rotate said dial at longer intervals such as to move a loaded base away from the loading station and a new base into the loading station, the first intermittent means comprising a ratchet wheel beneath said dial and centered between the loading station and the center of the dial, a pawl operated by said press to turn said ratchet wheel, a gear turned by said ratchet wheel, and a gear adapted to mesh with said ratchet gear secured beneath each of said nests, said nest gear coming into mesh with said ratchet gear as said nest moves into the loading station, and said dial rotating means comprising a Geneva tooth on said ratchet wheel and a Geneva gear on said dial, said tooth coming into mesh with said gear in proper timed relation to change the nest at the loading station when the base at the loading station has been filled with contacts, said socket being of the type having $n-1$ contacts at the spacing of $n$, and said nest being moved from position $n$ to position one by the relative motion of the nest and ratchet gear as the nest moves into the loading station, and being moved from position $n-1$ to position $n$ by the relative movement of the nest and ratchet gear as the nest moves away from the loading station, whereby the insertion of contacts may proceed continuously without interruption despite the blank position $n$ on each socket, means to drive the aforesaid means in properly timed relation, and means to support the aforesaid means.

11. Apparatus for making a vacuum tube socket having an insulation base and a ring of contacts each formed out of a single piece of sheet metal and each having a pin grip and a terminal connected by a bridge, said apparatus receiving a strip of embryo contacts disposed transversely of the strip and connected by a strand of sheet metal connecting the bridges, said apparatus comprising a reciprocating press having a punch to bend the terminal from horizontal to vertical position, another punch to bend the grip to vertical position, and another located at a loading station to sever the endmost contact from the strand and to insert it downward into an insulation base, an intermittently rotatable dial having a plurality of nests, each nest being rotatable on said dial and adapted to receive and rotate an insulation base having concentric rings of holes for the pin grips and terminal posts of said contacts, means to intermittently rotate the nest at said loading station until it is loaded with contacts, means to intermittently rotate said dial at longer intervals such as to move a loaded base away from the loading station and a new base into the loading station, means to drive the aforesaid means in properly timed relation, and means to support the aforesaid means.

12. Apparatus for making a vacuum tube socket having an insulation base and a ring of contacts each formed out of a single piece of sheet metal and each having a pin grip and a terminal connected by a bridge, said apparatus receiving a strip of embryo contacts disposed transversely of the strip and connected by a strand of sheet metal connecting the bridges, said apparatus comprising a reciprocating press having a punch to bend the terminal from horizontal to vertical position, another punch to bend the grip to vertical position, and another located at a loading station to sever the endmost contact from the strand and to insert it downward into an insulation base, an intermittently rotatable dial having a plurality of nests, each nest being rotatable on said dial and adapted to receive and rotate an insulation base having concentric rings of holes for the pin grips and terminal posts of said contacts, means to intermittently rotate the nest at said loading station until it is loaded with contacts, means to intermittently rotate said dial at longer intervals such as to move a loaded base away from the loading station and a new base into the loading station, the first intermittent means comprising a ratchet wheel beneath said dial and centered between the loading station and the center of the dial, a pawl operated by said press to turn said ratchet wheel, a gear turned by said ratchet wheel, a gear secured beneath each of said nests and adapted to mesh with said ratchet gear, said nest gear coming into mesh with said ratchet gear as said nest moves into the loading station means to drive the aforesaid means in properly timed relation, and means to support the aforesaid means.

13. Apparatus for making a vacuum tube socket having an insulation base and a ring of contacts each formed out of a single piece of sheet metal and each having a pin grip and a terminal connected by a bridge, said apparatus receiving a strip of embryo contacts disposed transversely of the strip and connected by a strand of sheet metal connecting the bridges, said apparatus comprising a reciprocating press having a punch to bend the terminal from horizontal to vertical position, another punch to bend the grip to vertical position, and another located at a loading station to sever the endmost contact from the strand and to insert it downward into an insulation base, an intermittently rotatable dial having a plurality of nests, each nest being rotatable on said dial and adapted to receive and rotate an insulation base having concentric rings of holes for the pin grips and terminal posts of said contacts, means to intermittently rotate the nest at said loading station until it is loaded with contacts, means to intermittently rotate said dial at longer intervals such as to move a loaded base away from the loading station and a new base into the loading station, the first intermittent means comprising a ratchet wheel beneath said dial and centered between the loading station and the center of the dial, a pawl operated by said press to turn said ratchet wheel, a gear turned by said ratchet wheel, a gear secured beneath each of said nests and adapted to mesh with said ratchet gear, said nest gear coming into mesh with said ratchet gear as said nest moves into the loading station, and said dial rotating means comprising a single Geneva tooth on said ratchet wheel and a Geneva gear on said dial, said tooth coming into mesh with said gear in proper timed relation to change the nest at the loading station when the base at the loading station has been filled with contacts means to drive the aforesaid means in properly timed relation, and means to support the aforesaid means.

14. Apparatus for making a vacuum tube socket having an insulation base and a ring of contacts each formed out of a single piece of sheet metal and each having a pin grip and a terminal connected by a bridge, said apparatus receiving a strip of embryo contacts disposed transversely of the strip and connected by a strand of sheet metal connecting the bridges, said apparatus comprising a reciprocating press having a punch to bend the terminal from horizontal to vertical position, another punch to bend the grip to vertical position, and another located at a loading station to sever the endmost contact from the strand and to insert it downward into an insulation base, an intermittently rotatable dial having a plurality of nests, each nest being rotatable on said dial and adapted to receive and rotate an insulation base having concentric rings of holes for the pin grips and terminal posts of said contacts, means to intermittently rotate the nest at said loading station until it is loaded with contacts, means to intermittently rotate said dial at longer intervals such as to move a loaded base away from the loading station and a new base into the loading station, the first intermittent means comprising a drive gear beneath said dial and centered between the loading station and the center of the dial, a gear adapted to mesh with said drive gear secured beneath each of said nests, said nest gear coming into mesh with said drive gear as said nest moves into the loading station, said socket being of the type having $n-1$ contacts at the spacing of $n$, and said nest being moved from position $n$ to position one by the relative motion of the nest and ratchet gear as the nest moves into the loading station, and being moved from position $n-1$ to position $n$ by the relative movement of the nest and ratchet gear as the nest moves away from the loading station, whereby the insertion of contacts may proceed continuously without interruption despite the blank position $n$ on each socket, means to drive the aforesaid means in properly timed relation, and means to support the aforesaid means.

15. Apparatus for making a vacuum tube socket having an insulation base and a ring of contacts each formed out of a single piece of sheet metal and each having a pin grip and a terminal connected by a bridge, said apparatus receiving a strip of embryo contacts disposed transversely of the strip and connected by a strand of sheet metal connecting the bridges, said apparatus comprising a reciprocating press having a punch to bend the terminal from horizontal to vertical position, another punch to bend the grip to vertical position, and another located at a loading station to sever the endmost contact from the strand and to insert it downward into an insulation base, an intermittently rotatable dial having a plurality of nests, each nest being rotatable on said dial and adapted to receive and rotate an insulation base having concentric rings of holes for the pin grips and terminal posts of said contacts, means to intermittently rotate the nest at said loading station until it is loaded with contacts, means to intermittently rotate said dial at longer intervals such as to move a loaded base away from the loading station and a new base into the loading station, the first intermittent means comprising a ratchet wheel beneath said dial and centered between the loading station and the center of the dial, a pawl operated by said press to turn said ratchet wheel, a gear turned by said ratchet wheel, a gear secured beneath each of said nests and adapted to mesh with said ratchet gear, said nest gear coming into mesh with said ratchet gear as said nest moves into the loading station, and said dial rotating means comprising a single Geneva tooth on said ratchet wheel and a Geneva gear on said dial, said tooth coming into mesh with said gear in proper timed relation to change the nest at the loading station when the base at the loading station has been filled with contacts, said socket being of the type having $n-1$ contacts at the spacing of $n$, and said nest being moved from position $n$ to position one by the relative motion of the nest and ratchet gear as the nest moves into the loading station, and being moved from position $n-1$ to position $n$ by the relative movement of the nest and ratchet gear as the nest moves away from the loading station, whereby the insertion of contacts may proceed continuously without interruption despite the blank position $n$ on each socket, means to drive the aforesaid means in properly timed relation, and means to support the aforesaid means.

16. Apparatus for making a vacuum tube socket having an insulation base and a plurality of contacts each formed out of a single piece of sheet metal and each having a pin grip and a terminal connected by a bridge, said apparatus receiving a strip of embryo contacts disposed transversely of the strip and connected by a strand of sheet metal which connects the bridges of the successive contacts, said bridge and grip and terminal being in alignment, said apparatus comprising a reciprocating press having a rotatable loading station, means to feed an insulation base to the loading station, means to turn the same step by step to receive successive contacts, a punch to bend the terminal from horizontal to vertical position, a punch to bend the pin grip to vertical position, another located at said loading station to sever the endmost contact from the strand and in the same stroke to insert said severed contact downward into an insulation base at said loading station, means to drive the aforesaid means in properly timed relation, and means to support the aforesaid means.

17. Apparatus for making a vacuum tube socket having an insulation base and a plurality of contacts each formed out of a single piece of sheet metal and each having a pin grip and a terminal connected by a bridge, said apparatus receiving a strip of embryo contacts disposed transversely of the strip and connected by two strands of sheet metal, one connecting the bridges and the other connecting the ends of the embryo contacts, said bridge and terminal being in alignment, said apparatus comprising a reciprocating press having a rotatable loading station, means to feed an insulation base to the loading station, means to turn the same step by step to receive successive contacts, a punch to cut away the strand connecting the ends, a punch to bend the pin grip and terminal to vertical position, a punch at said loading station to sever the end most contact from the second strand and in the same stroke to insert said severed contact downward into the insulation base at said loading station, means to drive the aforesaid means in properly timed relation, and means to support the aforesaid means.

18. Apparatus for making a vacuum tube socket having an insulation base and a plurality of contacts each formed out of a single piece of sheet metal and each having a pin grip and a hollow terminal post connected by a bridge, said apparatus receiving a strip of embryo contacts disposed transversely of the strip and connected by two strands of sheet metal, one connecting the bridges and the other connecting the ends of the grips, said bridge and grip and terminal being in alignment, said apparatus comprising a reciprocating press having a rotatable loading station, means to feed an insulation base to the loading station, means to turn the same step by step to receive successive contacts, a punch to bend the post from horizontal to vertical position, a punch to cut away the strand connecting the ends of the grips, a punch to bend the then freed grip to vertical position, another located at said loading station to sever the endmost contact from the second strand and in the same stroke to insert it downward into an insulation base at said loading station, means to drive the aforesaid means in properly timed relation, and means to support the aforesaid means.

19. Apparatus for making a vacuum tube socket having an insulation base and a plurality of contacts each formed out of a single piece of sheet metal and each having a pin grip and a terminal connected by a bridge, said apparatus comprising means to progressively punch and shape a strip of sheet metal to form a series of embryo contacts disposed transversely across the strip and connected to one another by a strand of sheet metal extending longitudinally of the strip, said bridge and terminal being in alignment, a rotatable loading station, means to feed an insulation base to the loading station, means to turn the same step by step to receive successive contacts, means for feeding the strip toward the loading station, means immediately adjacent the loading station for bending the terminal of said contact to a generally perpendicular position relative to the bridge and strand in order to finish shaping the contact, reciprocable means for severing the endmost contact and in the same stroke inserting it in an insulation base at said loading station, means to drive the aforesaid means in properly timed relation, and means to support the aforesaid means.

20. Apparatus for making a vacuum tube socket having an insulation base and a plurality of contacts each formed out of a single piece of sheet metal and each having a pin grip and a terminal connected by a bridge, said apparatus comprising means to progressively punch and shape a strip of sheet metal to form a series of embryo contacts disposed transversely of the strip and connected to one another by a strand of sheet metal which connects the bridges of the successive contacts, said bridge and grip and terminal being in alignment, a reciprocating press, said press having a rotatable loading station, means to feed an insulation base to the loading station, means to turn the same step by step to receive successive contacts, a punch to bend the terminal from horizontal to vertical position, a punch to bend the grip from horizontal to vertical position, a punch located at said loading station to sever the endmost contact from the strand and in the same stroke to insert it downward into an insulation base at said loading station, means to drive the aforesaid means in properly timed relation, and means to support the aforesaid means.

21. Apparatus for making a vacuum tube socket having an insulation base and a plurality of contacts each formed out of a single piece of sheet metal and each having a pin grip and a hollow terminal post connected by a bridge, said apparatus comprising means to progressively punch and shape a strip of sheet metal to form a series of embryo contacts disposed transversely of the strip and connected to one another by two strands of sheet metal, one connecting the bridges and the other connecting the ends of the grips, said bridge and grip and terminal being in alignment, a reciprocating press, said press having a rotatable loading station, means to feed an insulation base to the loading station, means to turn the same step by step to receive successive contacts, a punch to bend the post from horizontal to vertical position, a punch to cut away the strand connecting the ends of the grips, a punch to bend the then freed grip to vertical position, another punch located at said loading station to sever the endmost contact from the second strand and in the same stroke to insert it downward into an insulation base at said loading station, means to drive the aforesaid means in properly timed relation, and means to support the aforesaid means.

22. Apparatus for making a vacuum tube socket having an insulation base and a ring of contacts each formed out of a single piece of sheet metal and each having a pin grip and a hollow terminal post connected by a bridge, said apparatus receiving a strip of embryo contacts disposed transversely of the strip and connected by two strands of sheet metal, one connecting the bridges and the other connecting the ends of the grips, said apparatus comprising a reciprocating press having a punch to bend the post from horizontal to vertical position, another punch to cut away the strand connecting the ends of the grips, another punch to bend the grip to vertical position, and another located at a loading station to sever the endmost contact from the second strand and to insert it downward into an insulation base, an intermittently rotatable dial having a plurality of nests, each nest being rotatable on said dial and adapted to receive and rotate an insulation base having concentric rings of holes for the pin grips and terminal posts of said contacts, means to intermittently rotate the nest at said loading station until it is loaded with contacts, means to intermittently rotate said dial at longer intervals such as to move a loaded base away from the loading station and a new base into the loading station, means to drive the aforesaid means in properly timed relation, and means to support the aforesaid means.

References Cited in the file of this patent

UNITED STATES PATENTS

| | | |
|---|---|---|
| 1,953,476 | Gilbert | Apr. 3, 1934 |
| 2,061,575 | Hothersall | Nov. 24, 1936 |
| 2,078,365 | Biggert | Apr. 27, 1937 |
| 2,183,159 | Chesley | Dec. 13, 1939 |
| 2,270,300 | Hothersall | Jan. 20, 1942 |
| 2,322,290 | Gabel | June 22, 1943 |
| 2,404,197 | Sirp | July 16, 1946 |
| 2,526,717 | Weisberg | Oct. 24, 1950 |
| 2,654,332 | Klausmann | Oct. 6, 1953 |
| 2,659,406 | Locke | Nov. 17, 1953 |
| 2,700,206 | Gilbert | Jan. 25, 1955 |
| 2,711,466 | Marx | June 21, 1955 |
| 2,727,299 | Klumpp | Dec. 20, 1955 |